(12) United States Patent
Chen et al.

(10) Patent No.: US 9,983,618 B2
(45) Date of Patent: May 29, 2018

(54) OPTICAL TOUCH APPARATUS

(71) Applicant: Wistron Corporation, New Taipei (TW)

(72) Inventors: Yu-Yen Chen, New Taipei (TW); Po-Liang Huang, New Taipei (TW); Yu-Kai Su, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 48 days.

(21) Appl. No.: 14/964,649

(22) Filed: Dec. 10, 2015

(65) Prior Publication Data

US 2017/0031529 A1 Feb. 2, 2017

(30) Foreign Application Priority Data

Jul. 27, 2015 (TW) .............................. 104124268 A

(51) Int. Cl.
*G06F 3/042* (2006.01)
*G06F 1/16* (2006.01)
*G06F 3/041* (2006.01)

(52) U.S. Cl.
CPC .......... *G06F 1/1601* (2013.01); *G06F 3/0416* (2013.01); *G06F 3/0428* (2013.01)

(58) Field of Classification Search
CPC ...... G06F 3/042; G06F 3/0421; G06F 3/0423; G06F 3/0428; G06F 2203/04109; G06F 3/043; G06F 3/0433; G06F 3/0436; G06F 3/033; G06F 3/0354; G06F 3/03545; G06F 2203/04101; G06F 3/0317; G06F 3/03542; G06F 3/0386; G06F 3/03547; G06F 1/1601; G06F 3/0416; G06F 3/04

See application file for complete search history.

(56) References Cited

U.S. PATENT DOCUMENTS

| | | | | |
|---|---|---|---|---|
| 2002/0050985 A1* | 5/2002 | Takekawa | ............. | G06F 3/0421 345/173 |
| 2008/0259052 A1* | 10/2008 | Lin | ....................... | G06F 3/0421 345/175 |
| 2011/0267264 A1* | 11/2011 | McCarthy | ............... | G06F 3/017 345/157 |
| 2013/0106792 A1* | 5/2013 | Campbell | ............... | G06F 3/017 345/175 |

(Continued)

FOREIGN PATENT DOCUMENTS

| | | |
|---|---|---|
| CN | 201249604 Y | 6/2009 |
| CN | 201681496 U | 12/2010 |
| CN | 201792637 U | 4/2011 |

*Primary Examiner* — Lun-Yi Lao
*Assistant Examiner* — Jarurat Suteerawongsa
(74) *Attorney, Agent, or Firm* — McClure, Qualey & Rodack, LLP

(57) ABSTRACT

An optical touch apparatus including two touch panels, two optical sensing modules, and a rail device is provided. Each touch panel has two lateral sides separated from each other and a touch zone located between the two lateral sides. Each optical sensing module is disposed or near one lateral side of one of the touch panels. The rail device is coupled to the two touch panels, such that two touch panels can slide in parallel along a predetermined direction and can be selectively operated in one of a first touching mode and a second touching mode, and the optical touch apparatus can flexibly change its size of touch zone.

11 Claims, 7 Drawing Sheets

(56) References Cited

U.S. PATENT DOCUMENTS

2014/0378183 A1* 12/2014 Xiong ............... H04M 1/72522
                                                    455/556.1
2015/0077365 A1* 3/2015 Sasaki ................... G06F 3/1446
                                                    345/173

* cited by examiner

OPTICAL TOUCH APPARATUS

This application claims the benefit of Taiwan application Serial No. 104124268, filed Jul. 27, 2015, the subject matter of which is incorporated herein by reference.

BACKGROUND OF THE INVENTION

Field of the Invention

The invention relates in general to a touch apparatus, and more particularly to an optical touch apparatus.

Description of the Related Art

As modern people are having more and more requirements of touch screen and the size of touch panel is getting larger and larger, the manufacturers, facing the pressure of high cost for manufacturing large-sized touch panels, gradually adopt optical touch technology. Furthermore, as the light-emitting diode (LED) element technology advances and is used in conjunction with the optical touch technology, optical touch products have gained more and more popularity and have replaced original resistive or capacitive touch products. In recent years, more and more large-sized touch panels such as desktop touch panels are using the optical touch technology.

In general, the optical touch panels currently available in the market can be divided into embedded type and plug-in type. The embedded type is featured in that most optical sensing modules are installed inside or on the rear side of the touch panel. The plug-in type is featured in that the optical sensing modules are installed at at least two corners of the touch panel. The plug-in type optical touch panels normally have two ways for sensing optical touch, that is, reflective type and light-shielding type. According to the light-shielding type, a sensing element is used to detect and determine the position of a dark spot generated by the light-shielding effect of the touch object. According to the reflective type, a sensing element is used to detect and determine the position of a bright spot generated by the reflection effect of the touch object.

In response to the requirements of briefing or teaching using large-sized display and touch control, single or multiple large-sized touch panels are used as primary displays and input interfaces such as the optical touch apparatus 110 with single touch panel or the optical touch apparatus 120 with double touch panels of FIG. 1. The operation principles are illustrated in FIG. 2A and FIG. 2B. FIG. 2A and FIG. 2B respectively illustrate a front view and a side view of a generally known plug-in optical touch apparatus 200. The touch panel 210 has two optical image capturing sensors 220, such as shooting lens, disposed thereon. The optical image capturing sensors 220 are electrically connected to the controller 230, and are respectively located at the top left corner and the top right corner of the touch panel 210. The touch panel 210 may include an LCD 210b and a protective glass 210a. The optical image capturing sensor 220 further has a light source 240, such as an infrared light light-emitting diode (IR LED).

When the user operates a touch reflective pen 250 on the protective glass 210a, the reflective material of the touch reflective pen 250 receives an infrared light from the light source 240, and reflects part of the infrared light. Both the two optical image capturing sensors 220 will receive the reflected light and generate a significant surge signal for the controller 230 to calculate the position of the touch reflective pen 250 by using the triangulation method.

The plug-in type optical touch apparatus, having simple structure and not interfering with or affecting the manufacturing process of liquid crystal display (LCD), is very suitable to be used in large-sized touch panel, and is more competitive than other touch panel in terms of material cost.

The large-sized touch panel is the main-stream of the optical touch panel, and is widely used in electronic products such as smart TV, interactive electronic billboard, and electronic whiteboard. The large-sized touch panel is ideal in the application fields such as office, education, advertisement and exhibition.

Most of the large-sized touch screens commonly seen in the market are the optical touch apparatus 110 of single touch panel or the optical touch apparatus 120 of double touch panels as indicated in FIG. 1. However, no matter the optical touch apparatus 110 or the optical touch apparatus 120 of the prior art, the size of the touch screen is fixed and cannot be flexibly adjusted to meet the users' needs, the commonality is poor and the application fields of optical touch products are restricted. Therefore, how to resolve the abovementioned needs and provide an optical touch one machine having versatile functions, which largely increases procurement cost and increases product competiveness, is a prominent task for the optical touch industries.

SUMMARY OF THE INVENTION

The invention is directed to an optical touch apparatus whose two touch panels can be overlapped to form one machine architecture which can be freely switched between a single touch panel mode and a double panel interface mode through a smart sliding mechanism, not only keeping the feature of interactive multi-touch but also resolving the problem of the touch zone of optical touch products lacking sufficient elasticity.

According to one embodiment of the present invention, an optical touch apparatus is provided. An optical touch apparatus includes two touch panels, two optical sensing modules and a rail device. Each touch panel has two lateral sides separated from each other in a predetermined direction and a touch zone located between the two lateral sides of each touch panel. The optical sensing modules are respectively disposed at or near one lateral side of one of the touch panels. The rail device is coupled to the two touch panels, such that the two touch panels can slide along the predetermined direction and can be selectively operated at one of a first touching mode and a second touching mode. In the first touching mode, the two touch panels are moved toward each other, such that one of the touch panels overlaps another one of the touch panels, only the touch zone of one of the touch panels arranged atop is exposed and can be operated, and the optical sensing module of another one of the touch panels arranged underneath is exposed outside the lateral side of the touch panel arranged atop and is not shielded, and the two optical sensing modules detect one of the touch zone which is exposed. In the second touching mode, the two touch panels are moved away from each other along the predetermined direction, such that the two touch zones both are exposed and can be operated, and each optical sensing module of each touch panel only detects respective touch zone of the touch panel.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides an optical touch apparatus capable of flexibly adjusting its size of by moving the two touch panel. The optical touch apparatus can be freely switched between a single touch panel mode and a double panel interface mode through a smart rail design, not only keeping the feature of interactive multi-touch but also resolving the problem of the touch zone of optical touch products lacking sufficient elasticity.

Figure 1:
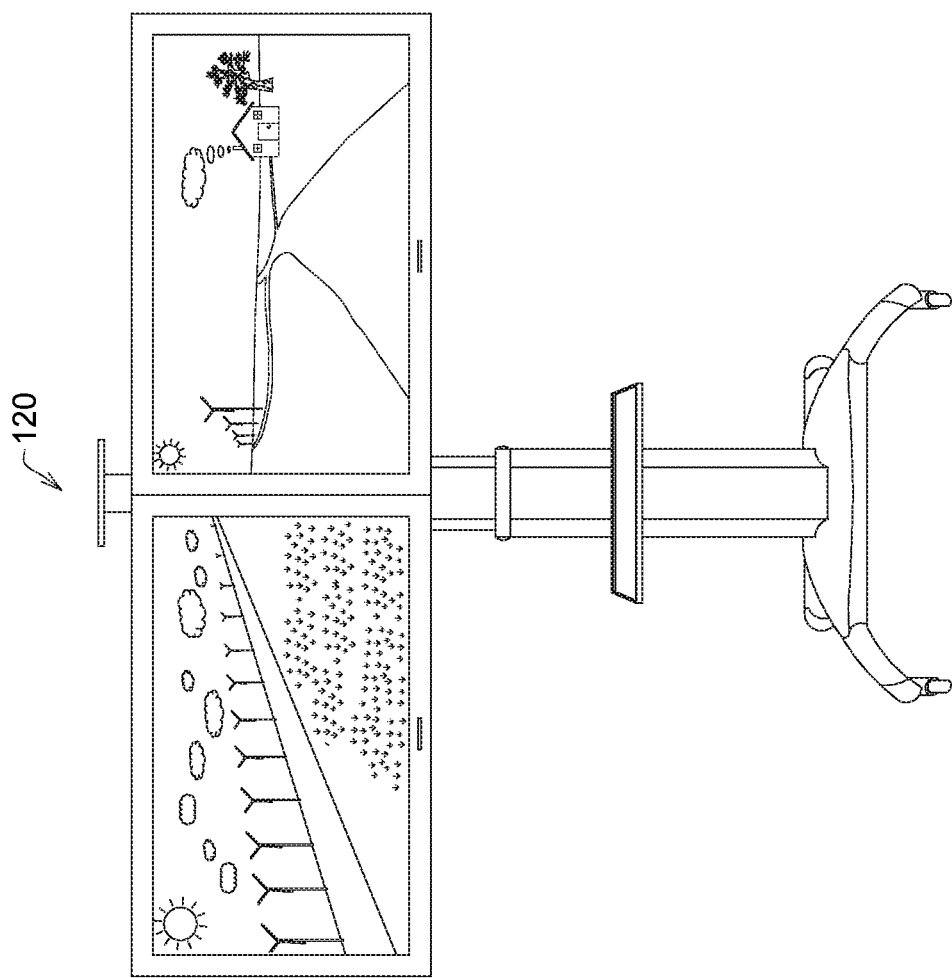
FIG. 1 is an implementation of a generally known optical touch one machine.
Figure 1:
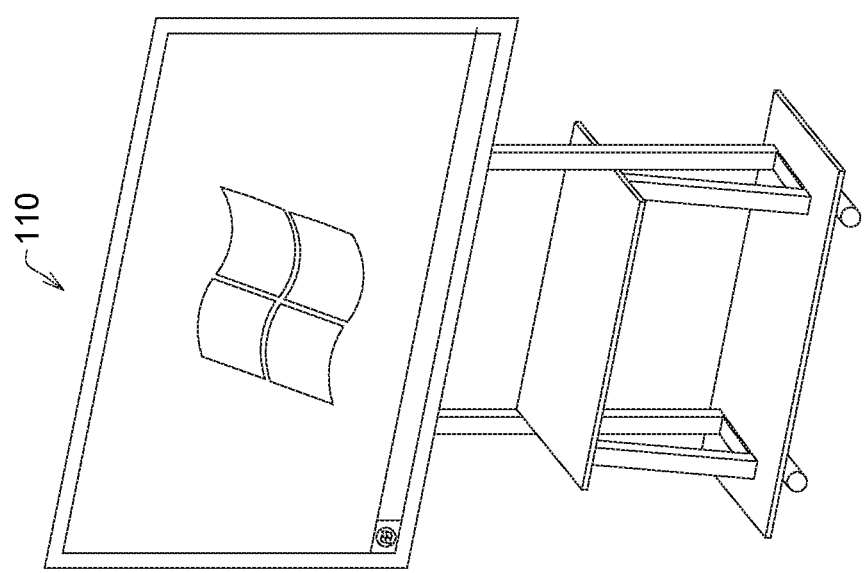
Figure 2A:
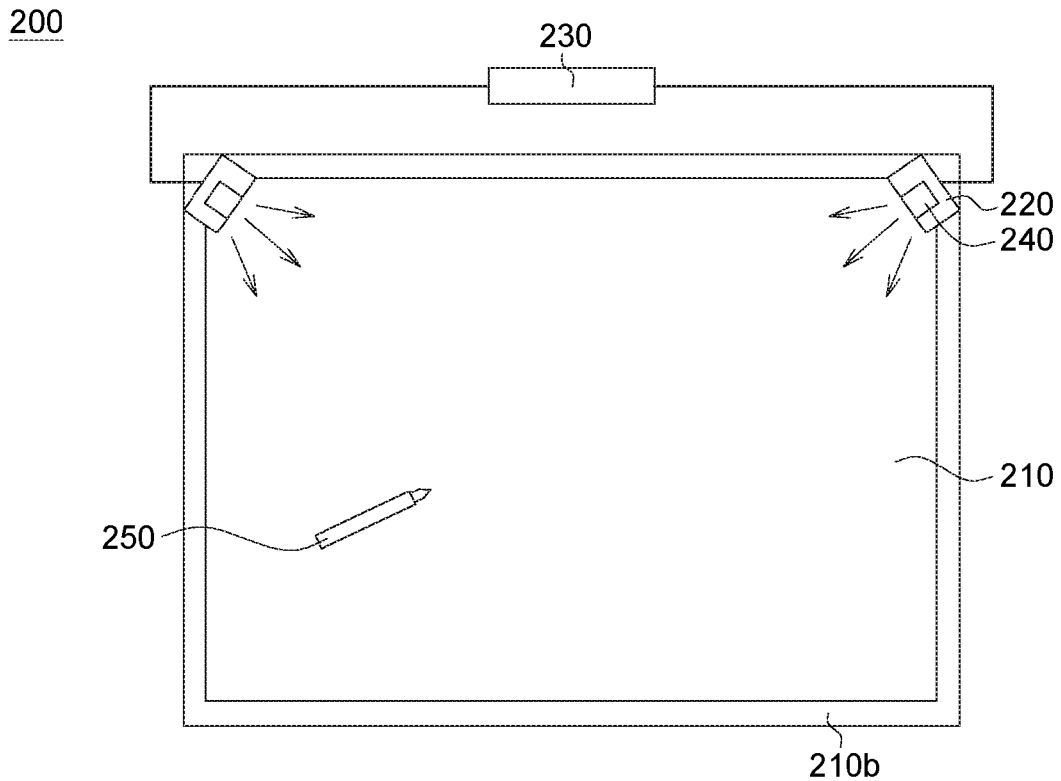
FIG. 2A illustrates a front view of a generally known plug-in optical touch apparatus.
Figure 2B:
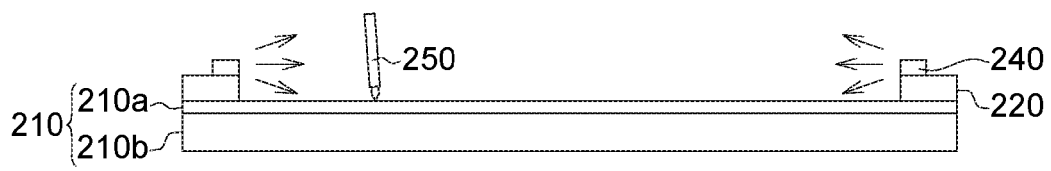
FIG. 2B illustrates a side view of a generally known plug-in optical touch apparatus.
Figure 3A:
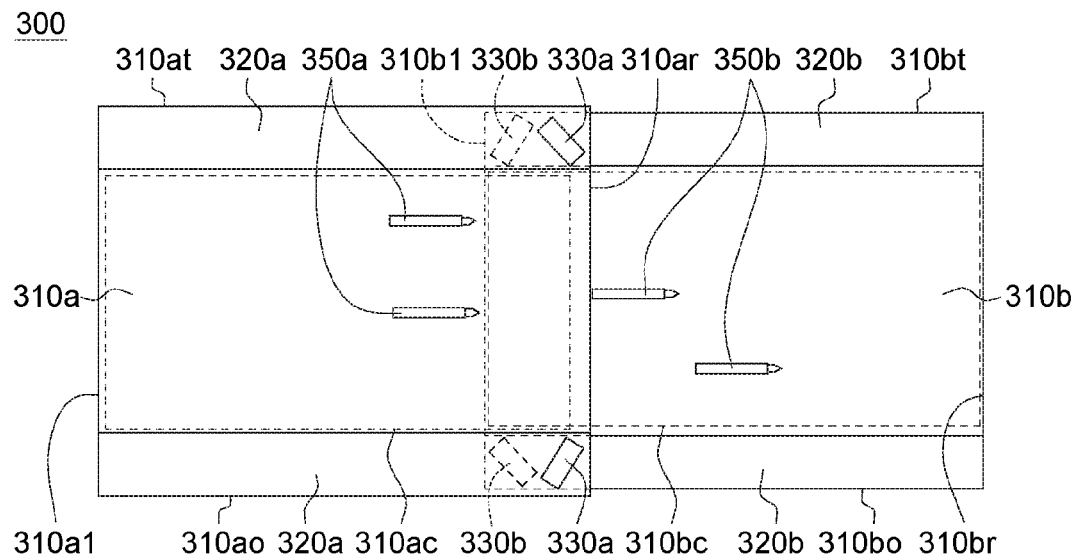
FIG. 3A illustrates a front view of an optical touch apparatus in a double panels interface mode according to an embodiment of the invention.
Figure 3B:
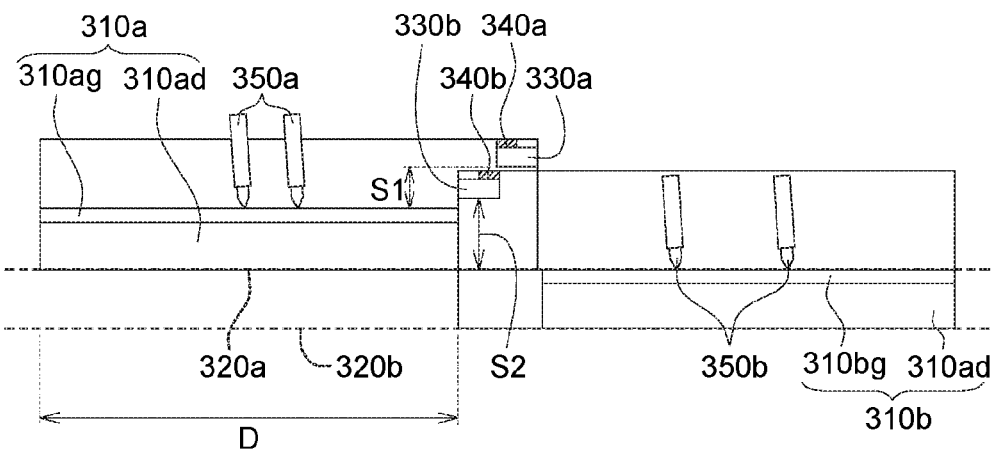
FIG. 3B illustrates a side view of an optical touch apparatus in a double panels interface mode according to an embodiment of the invention.

Referring to FIG. 3A and FIG. 3B, a front view and a side view of an optical touch apparatus 300 in a two touch panels interface mode according to an embodiment of the invention are respectively shown. The optical touch apparatus 300 includes a first touch panel 310a and a second touch panel 310b. The first touch panel 310a has a left lateral side 310al, a right lateral side 310ar parallel to the left lateral side 310al, an upper side 310at and a lower side 310ao parallel to the upper side 310at, and has a first touch zone. The upper side 310at and the right lateral side 310ar are vertically adjacent to each other. Likewise, the second touch panel 310b has a left lateral side 310bl, a right lateral side 310br parallel to the left lateral side 310bl, and has a second touch zone. The upper side 310bt and the left lateral side 310bl are vertically adjacent to each other. The first touch panel 310a includes a protective glass 310ag and a display panel 310ad. The second touch panel 310b includes a protective glass 310bg and a display panel 310bd. When the optical touch apparatus 300 is in a two touch panels interface mode, the first touch panel 310a and the second touch panel 310b can be horizontally moved away, and the right lateral side 310ar of the first touch panel 310a and the left lateral side 310bl of the second touch panel 310b are close to or even overlapped with each other. Meanwhile, both the first touch panel 310a and the second touch panel 310b can display images and can be operated by the user via touch control. It should be noted that the first touch panel 310a and the second touch panel 310b, when viewed from the front, are continuously adjacent to each other as indicated in FIG. 3A.

On the first touch panel 310a, two first rails 320a are horizontally disposed in parallel at the upper side 310at and the lower side 310ao. That is, one first rail 320a is disposed along the extending direction of the upper side 310at. On the second touch panel 310b, two second rails 320b are horizontally disposed in parallel at the upper side 310bt and the lower side 310bo. That is, one second rail 320b is disposed along the extending direction of the upper side 310bt. The upper side 310at of the first touch panel 310a and the upper side 310bt of the second touch panel 310b are parallel to each other, and so the first rail 320a and the second rail 320b are also parallel to each other. Furthermore, the first rail 320a and the second rail 320b are connected to each other, such that the first rail 320a can horizontally slide on the second rail 320b. That is, the first rail 320a can slide on the second rail 320b along the extending direction of the upper side 310at of the first touch panel 310a. In another embodiment, the second rail 320b can horizontally slide on the first rail 320a. That is, the second rail 320b can slide on the first rail 320a along the extending direction of the upper side 310bt of the second touch panel 310b.

Referring to FIG. 3A, the first touch panel 310a and the second touch panel 310b form a common touch interface. The first touch panel 310a and the second touch panel 310b respectively have a touch zone 310ac and a touch zone 310bc. Referring to FIG. 3B, a touch panel (such as the second touch panel 310b) has a movable distance D along a rail (such as the second rail 320b). When the second touch panel 310b is not moved, as indicated in the front view, the common touch interface has two touch zones 310ac and 310bc adjacent to each other. Each of the touch zones has an independent touch area, so the common touch interface has a larger touch area. After the second touch panel 310b is moved to the left by the movable distance D, the second touch panel 310b slides to the underneath of the first touch panel 310a. In the drawing, the length of the movable distance D is merely for exemplary purpose, not for limiting actual implementation, and can be adjusted according to actual needs. As indicated in the front view, the touch areas of the touch zones 310ac and 310bc overlap with each other. Meanwhile, the common touch interface has a smaller touch area. Therefore, the touch area of the common touch interface can be adjusted by moving a touch panel (such as the second touch panel 310b) a movable distance along a rail (such as the second rail 320b). Besides, the invention is not limited to the said implementation in which the touch area of the common touch panel is adjusted by moving one single touch panel. According to another implementation of the invention, the touch area of the common touch panel can be adjusted by moving two touch panels with respect to each other, and the detailed description of the implementation are disclosed below.

Refer to FIG. 3A and FIG. 3B. At least one optical sensor 330a is disposed at or near the right lateral side of the first touch panel 310a. For example, at least one optical sensor 330a is disposed at one end of each of the two first rails 320a near the right lateral side 310ar. The quantity of the at least one optical sensors 330a is exemplified by two. Preferably, the optical sensors 330a are disposed near the top right corner and the bottom right corner of the first touch panel 310a. Similarly, at least one optical sensor 330b is disposed at or near the left lateral side of the second touch panel 310b. For example, at least one optical sensor 330b is disposed at one end of each of two second rails 320b near the left lateral side 310*bl*. The quantity of the at least one optical sensor 330*b* is exemplified by two. Preferably, the optical sensors 330*b* are disposed at the top left corner and the bottom left corner of the second touch panel 310*b*. Each of the optical sensors 330*a* and 330*b* is preferably integrated in an optical image capturing module having a light source and a shooting lens. Alternatively, each of the optical sensors 330*a* and 330*b* can have a shooting lens only, and the light sources 340*a* and 340*b* are respectively disposed on the optical sensors 330*a* and 330*b*.

It should be noted that the optical sensors 330*a* and 330*b* of the invention are neither disposed on nor contacting the surface of the corner of the first touch panel 310*a* or the second touch panel 310*b* like the prior art. Instead, the optical sensors 330*a* and 330*b* are separated from the first touch panel 310*a* or the second touch panel 310*b* by an interval distance in a vertical height direction. Refer to FIG. 3B. The optical sensor 330*a* and the first touch panel 310*a* are separated by a first interval distance S1 in the vertical height direction, and the optical sensor 330*b* and the second touch panel 310*b* are separated by a second interval distance S2 in the vertical height direction. The first interval distance S1 and the second interval distance S2 provide a space for the first rail 320*a* and the second rail 320*b*, such that the optical touch apparatus of the invention can selectively and freely switch between the single panel interface mode and the double panels interface mode. For example, when the user wants to switch the optical touch apparatus to the single panel interface mode from the double panels interface mode, the second touch panel 310*b* slides to the underneath of the first touch panel 310*a* through the rail design of the invention.

The optical sensors 330*a* and 330*b* respectively have light sources 340*a* and 340*b*. Preferably, the light sources 340*a* and 340*b* are realized by such as infrared light light-emitting diodes (IR LED). The optical sensor 330*a* captures optical image of a reflective element 350*a* of the first touch panel 310*a*. The optical sensor 330*b* captures optical image of a reflective element 350*b* of the second touch panel 310*b*. The reflective elements 350*a* and 350*b* can be realized by such as reflective pens or reflective strips. The reflective elements 350*a* and 350*b* can be formed of transparent micro-beads (not illustrated) for reflecting the light. Each of the first touch panel 310*a* and the second touch panel 310*b* has two optical sensors 330*a* and 330*b*, and supports at least two-point touch recognition. That is, the two reflective elements 350*a* can be operated on the first touch panel 310*a* at the same time, and so the two reflective elements 350*b* can be operated on the second touch panel 310*b* at the same time. All the coordinates of the reflective elements 350*a* and 350*b* can be recognized correctly. When the user operates the reflective element 350*a* on the first touch panel 310*a*, the reflective element 350*a* receives an infrared light from the light source 340*a* and reflects part of the infrared light. The optical sensor 330*a*, after receiving the reflected light, generates a significant surge signal, and the position of the reflective element 350*a* is calculated by using the triangulation method. Similarly, when the user operates the reflective element 350*b* on the second touch panel 310*b*, the reflective zone of the reflective element 350*b* receives an infrared light from the light source 340*b*, and further reflects the infrared light along the original beam path. The optical sensor 330*b*, after receiving a reflected light, generates a significant surge signal, and the position of the reflective element 350*b* is calculated by using the triangulation method.

Figure 6A:
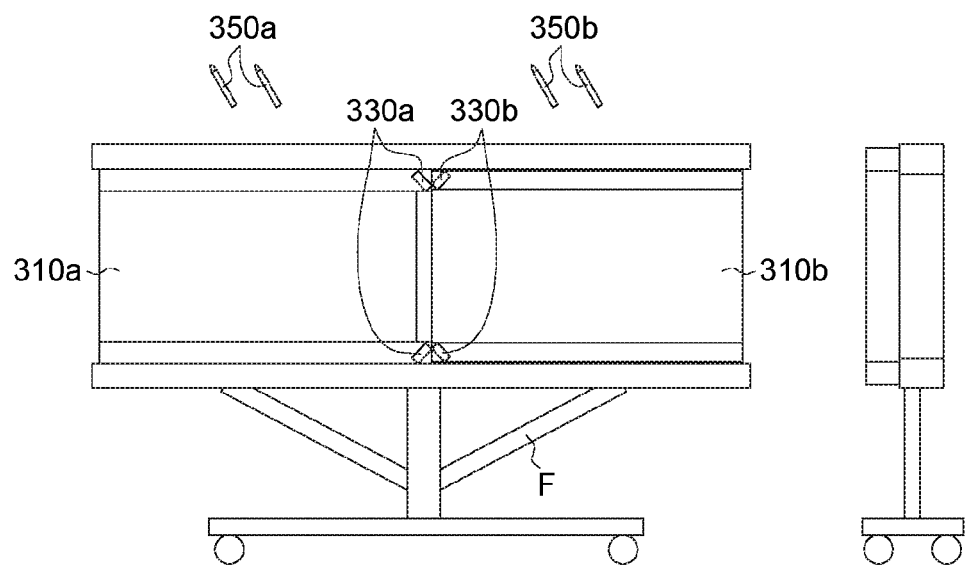
FIG. 6A illustrates a schematic diagram of an optical touch apparatus in a double panels interface mode according to the invention.

Referring to FIG. 6A, a schematic diagram of an optical touch apparatus in a double panels interface mode according to the invention is shown. The optical touch apparatus 300 is installed on a bracket F and used as an optical touch one machine having the double panels interfaces mode. The first touch panel 310*a* can be move away from the second touch panel 310*b*. The right lateral side 310*ar* of the first touch panel 310*a* (illustrated in FIG. 3A) and the left lateral side 310*b*1 of the second touch panel 310*b* (illustrated in FIG. 3A) are close to or even overlapped with each other. Meanwhile, the first touch panel 310*a* and the second touch panel 310*b* can display images and can be operated by the user via touch control. The optical sensor 330*a* captures optical image of the reflective element 350*a* of the first touch panel 310*a*. The optical sensor 330*b* captures optical image of the reflective element 350*b* of the second touch panel 310*b*. The reflective elements 350*a* and 350*b* reflect light. Meanwhile, the first touch panel 310*a* and the second touch panel 310*b* both support two-point touch recognition. That is, the two reflective elements 350*a* can be operated on the first touch panel 310*a* at the same time, so can the two reflective elements 350*b* be operated on the second touch panel 310*b* at the same time.

Figure 4A:
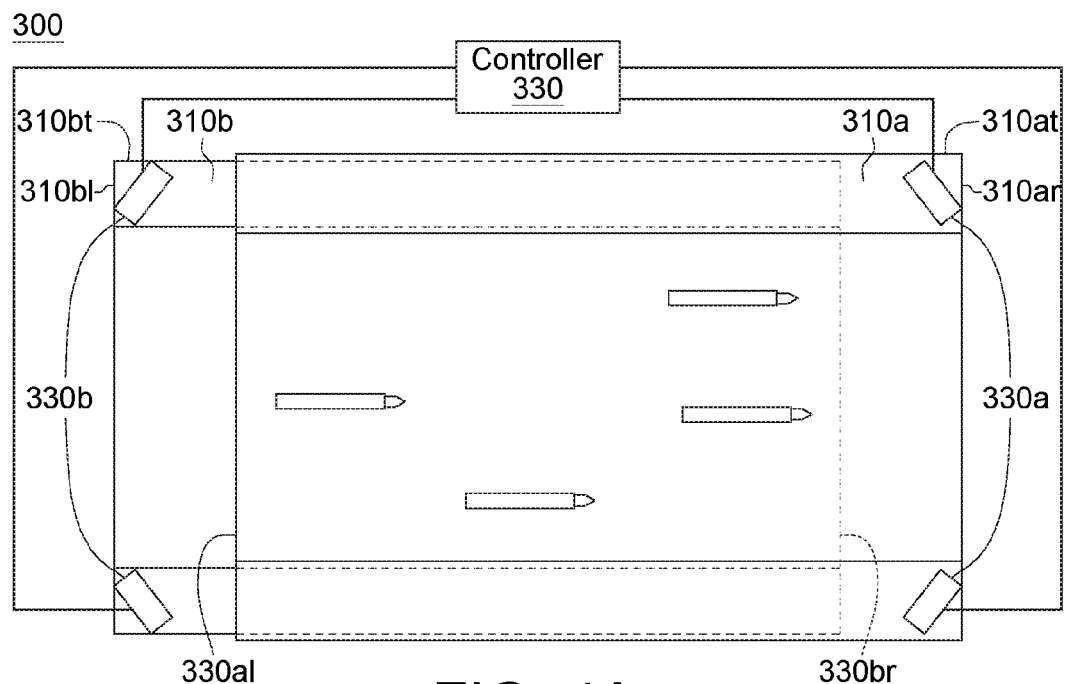
FIG. 4A illustrates a front view of an optical touch apparatus in single panel interface mode according to an embodiment of the invention.
Figure 4B:
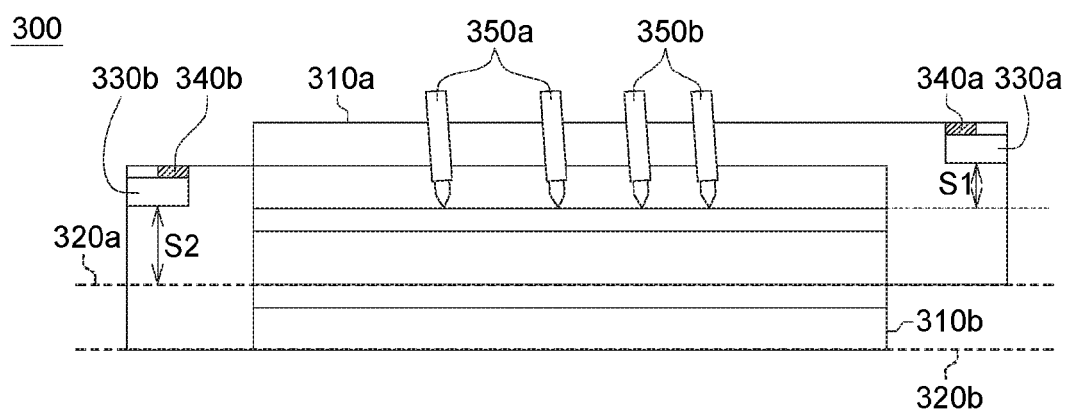
FIG. 4B illustrates a side view of an optical touch apparatus in single panel interface mode according to an embodiment of the invention.

Referring to FIG. 4A and FIG. 4B, a front view of and is a side view of the optical touch apparatus 300 in the single panel interface mode according to an embodiment of the invention are respectively shown. When the optical touch apparatus 300 is in the single panel interface mode, the first touch panel 310*a* and the second touch panel 310*b* overlap with each other, and the right lateral side 310*ar* of the first touch panel 310*a* and the left lateral side 310*bl* of the second touch panel 310*b* do not overlap with each other but are separated from each other. Meanwhile, only one of the first touch panel 310*a* and the second touch panel 310*b* can display image and can be operated by the user via touch control. For example, the first touch panel 310*a* at the top of FIG. 4B can be operated by the user.

Refer to FIG. 4A and FIG. 4B. Since the optical touch apparatus 300 is in the single panel interface mode, only the first touch panel 310*a* can display images and can be operated by the user via touch control. The optical sensors 330*a* and 330*b* together capture optical image of the reflective element 350*b* of the first touch panel 310*a*, such that the first touch panel 310*a* can support four-point touch recognition and double the touch efficiency.

The reflective elements 350*a* and 350*b* can be realized by such as reflective pens or reflective strips. The reflective elements 350*a* and 350*b* can be formed of transparent micro-beads (not illustrated) for reflecting the light. Meanwhile, the first touch panel 310*a* supports four-point touch recognition. That is, four reflective elements, including two reflective elements 350*a* and two reflective elements 350*b*, can be operated on the first touch panel 310*a* at the same time. When the user operates the reflective elements 350*a* and 350*b* on the first touch panel 310*a*, the reflective element 350*a* receives an infrared light from the light source 340*a* and, and the reflective element 350*b* receives an infrared light from the light source 340*b* and reflects part of the infrared light. The optical sensors 330*a* and 330*b*, after receiving the reflected light, generate an obvious surge signal, and the positions of the reflective elements 350*a* and 350*b* are calculated by using the triangulation method.

Figure 6B:
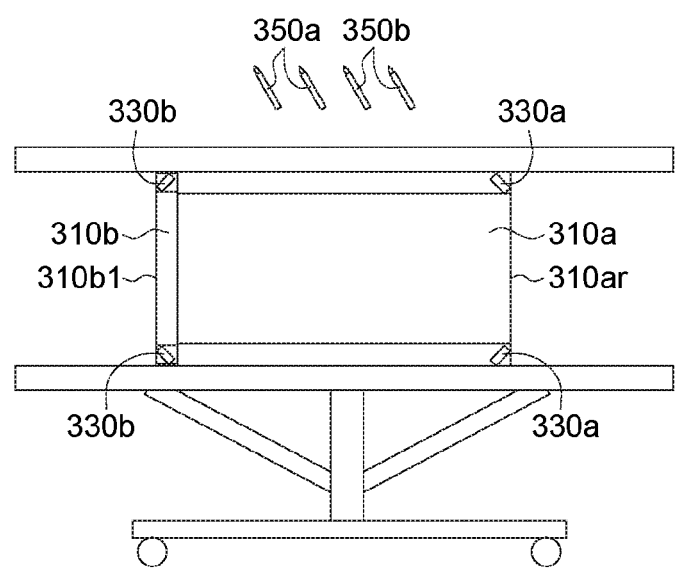
FIG. 6B illustrates a schematic diagram of an optical touch apparatus in single panel interface mode according to the invention.

Referring to FIG. 6B, a schematic diagram of the optical touch apparatus 300 in the single panel interface mode according to the invention is shown. The first touch panel 310*a* overlaps the second touch panel 310*b*, and the right lateral side 310*ar* of the first touch panel 310*a* and the left lateral side 310*bl* of the second touch panel 310*b* are separated from each other until the right lateral side 310*ar* of the first touch panel 310*a* and the left lateral side 310*al* (illustrated in FIG. 4A) are close to the right lateral side 310*br* and the left lateral side 310*bl* of the second touch panel 310*b* (illustrated in FIG. 4A) respectively. That is, the first touch panel 310*a* overlaps most part of the second touch panel 310*b*. Meanwhile, only one of the first touch panel 310*a* and the second touch panel 310*b* arranged atop can display images and can be operated by the user via touch control. For example, the first touch panel 310*a* at the top of FIG. 4B is arranged atop. Meanwhile, the optical sensor 330*b* located to the left end of the second touch panel 310*b* is exposed from the left end of the first touch panel 310*a*. Therefore, the optical sensors 330*a* located at the top right corner and the bottom right corner capture optical image of the reflective element 350*a* of the first touch panel 310*a*, and the optical sensors 330*b* located at the top left corner and the bottom left corner also capture optical image of the reflective element 350*b* of the first touch panel 310*a*. Thus, the first touch panel 310*a* supports at least four-point touch recognition. That is, four reflective elements, including two reflective elements 350*a* and two reflective elements 350*b*, can be operated on the first touch panel 310*a*, and the quantity of recognized touch points can be doubled.

Figure 5A:
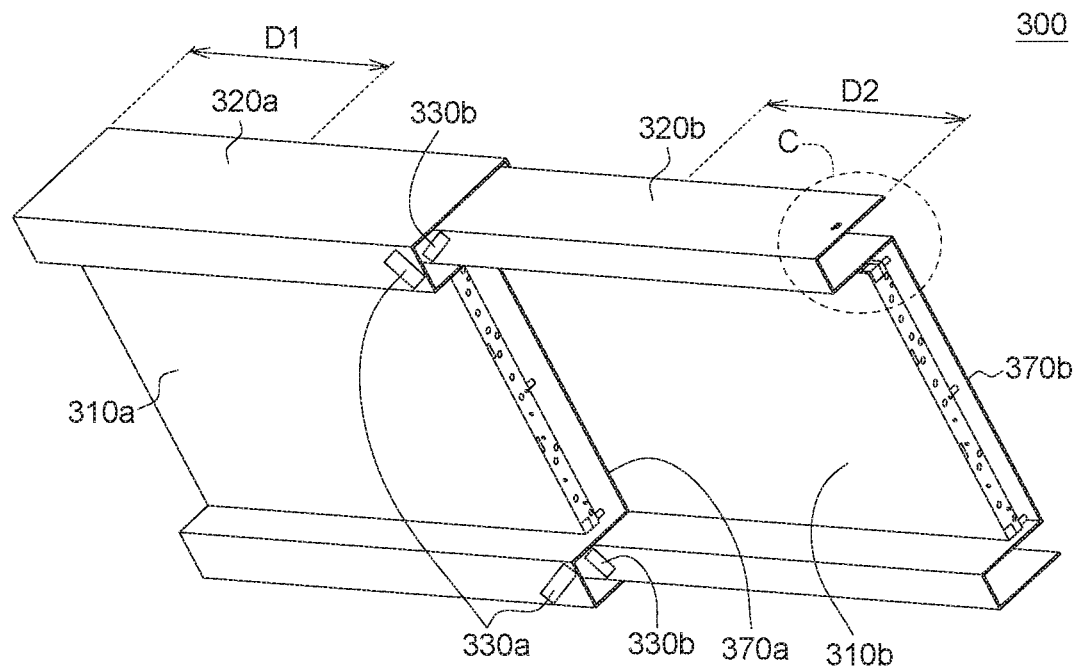
FIG. 5A illustrates a 3D schematic diagram of an optical touch apparatus according to an embodiment of the invention.
Figure 5B:
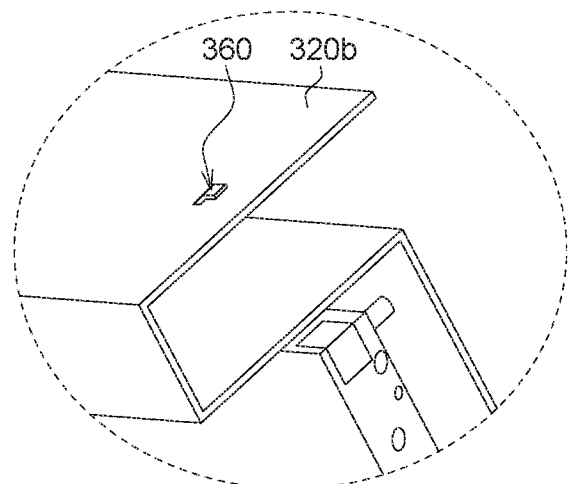
FIG. 5B illustrates a partial enlargement of the optical touch apparatus of FIG. 5A.
Figure 5C:
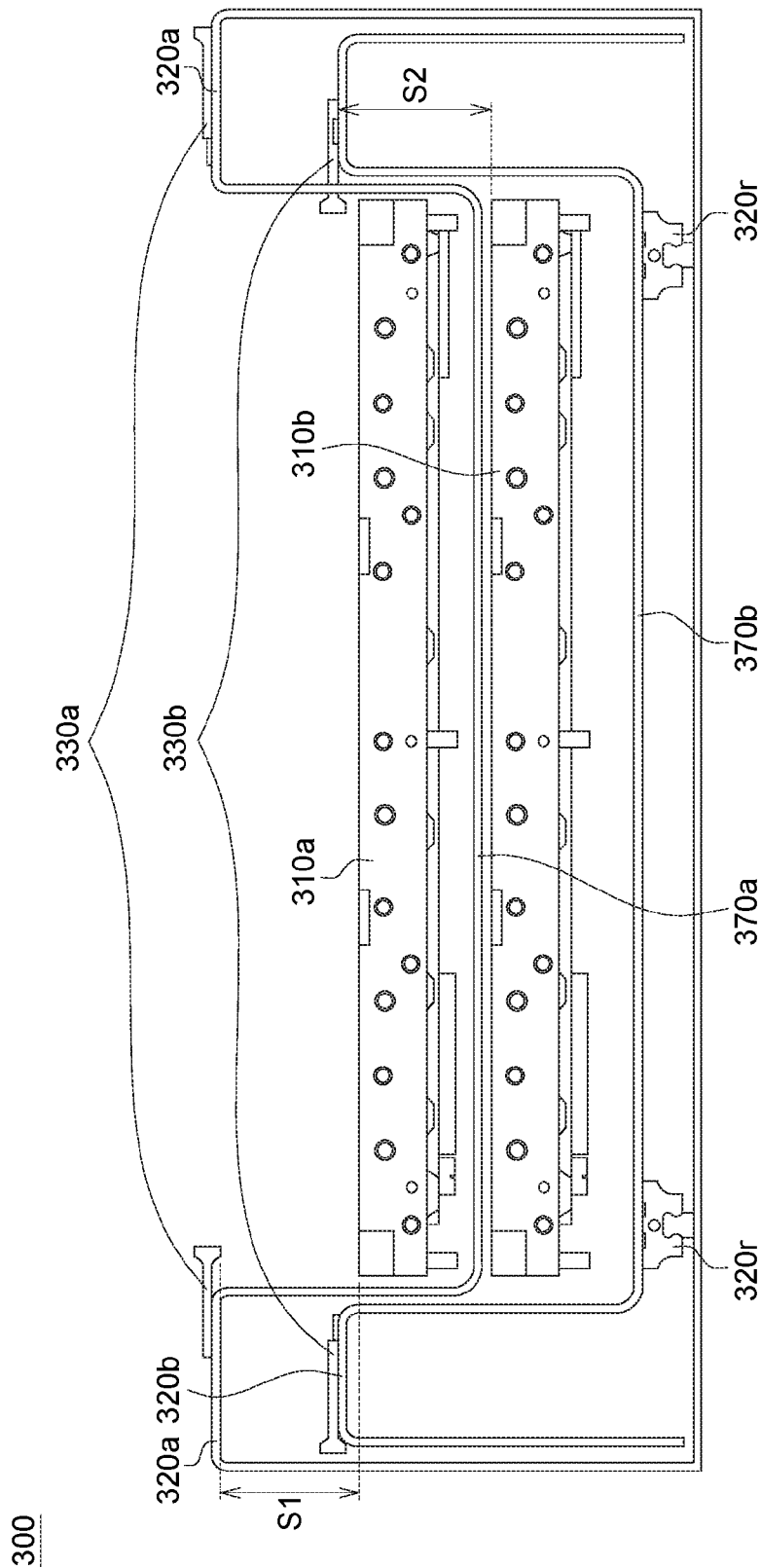
FIG. 5C illustrates a side view of an optical touch apparatus according to an embodiment of the invention.

Refer to FIG. 5A to FIG. 5C. FIG. 5A is a 3D schematic diagram of the optical touch apparatus 300 according to an embodiment of the invention. The first touch panel 310*a* and the second touch panel 310*b* respectively have a movable distance D1 and a movable distance D2, such that the first touch panel 310*a* and the second touch panel 310*b* can overlap with each other or can be moved away from each other. The movable distances D1 and D2 are about half the length of the first rail 320*a* and the second rail 320*b*. FIG. 5B is a partial enlargement of the optical touch apparatus of FIG. 5A. FIG. 5C is a side view of the optical touch apparatus 300 according to an embodiment of the invention. In the extendable optical touch apparatus 300 disclosed above, the first touch panel 310*a* has the first rail 320*a*, and the second touch panel 310*b* has the second rail 320*b*. The first rail 320*a* and the second rail 320*b* can be connected to each other, such that the first rail 320*a* can horizontally slide on the second rail 320*b*. As indicated in FIG. 5A, the optical sensor 330*a* is disposed at the right end of the first rail 320*a* and the optical sensor 330*b* is disposed at the left end of the second rail 320*b*. Refer to FIG. 5C. The first rail 320*a* is a protruded structure protruded from the first touch panel 310*a*, such that the optical sensor 330*a* is separated from the first touch panel 310*a* by the first interval distance S1 in the vertical height direction. The second rail 320*b* is a protruded structure protruded from the second touch panel 310*b*, such that the optical sensor 330*b* is separated from the second touch panel 310*b* by the second interval distance S2 in the vertical height direction. Moreover, a first bearing plate 370*a* is connected between two first rails 320*a* for carrying the first touch panel 310*a*; and a second bearing plate 370*b* is connected between two second rails 320*b* for carrying the second touch panel 310*b*.

The design of the first interval distance S1 and the second interval distance S2 reserves a space for the first rail 320*a* and the second rail 320*b* and allows the optical sensor 330*b* located at the left end of the second rail 320*b* to pass through the first rail 320*a* to be exposed from the left end of the first rail 320*a*, such that the optical touch apparatus can switch to the single panel interface mode. Moreover, when the optical touch apparatus 300 is in the double panels interface mode, the optical sensors 330*a* and 330*b* respectively capture optical image of the reflective elements 350*a* and 350*b* of the first touch panel 310*a* and the second touch panel 310*b*, such that the optical touch apparatus 300 can smoothly switch between the single panel interface mode and the double panels interface mode. For example, when the optical touch apparatus 300 is in the single panel interface mode, the second optical sensor 330*b* is exposed outside the left lateral side 310*al* of the first touch panel 310*a* (illustrated in FIG. 4A) and detects the first touch zone together with the optical sensor 330*a* located on the right lateral side 310*ar* of the first touch panel 310*a*. When the optical touch apparatus 300 is in the double panels interface mode, the optical sensor 330*a* and the optical sensor 330*b* independently detect the first touch zone and the second touch zone. When the user wants to switch the optical touch apparatus to the single panel interface mode from the double panels interface mode, the second touch panel 310*b* slides to the underneath of the first touch panel 310*a* through the rail design of the invention. When the user wants to switch the optical touch apparatus to the double panels interface mode from the single panel interface mode, the second touch panel 310*b* slides out from the underneath of the first touch panel 310*a* through the rail design of the invention, such that the first touch panel 310*a* and the second touch panel 310*b* are moved away from each other.

Refer to FIG. 5C. At least a sliding aid 320*r* can be disposed between the first rail 320*a* and the second rail 320*b*, between the first rail 320*a* and the first bearing plate 370*a*, or between the second rail 320*b* and the second bearing plate 370*b*, such that the first touch panel 310*a* and the second touch panel 310*b* can smoothly slide between the first rail 320*a* and the first bearing plate 370*a* or between the second rail 320*b* and the second bearing plate 370*b* to change the overlapping state of the first touch panel 310*a* and the second touch panel 310*b*. The overlapping state includes the single panel interface mode and the double panels interface mode.

Refer to FIG. 5B. In an embodiment of the invention, a sensing switch 360 is further disposed on the second rail 320*b* for informing the controller 330 (illustrated in FIG. 4A) of whether the optical touch apparatus 300 is in the single panel interface mode or the double panels interface mode. If the user slides the second touch panel 310*b* to the underneath of the first touch panel 310*a*, the sensing switch 360 will detect the single panel interface mode. For example, the first touch panel 310*a* can be operated via touch control, but the second touch panel 310*b* cannot be operated. Meanwhile, the sensing switch 360 will inform the controller 330 that the optical touch apparatus 300 has been switched to the four optical sensors and the coordinates of at least four touch points can be calculated and recognized at a time. Therefore, the first touch panel 310*a* supports four-point touch recognition. If it is detected that the optical touch apparatus is in the double panels interface mode, the controller 330 will switch to the two optical sensors, and the coordinates of at least two touch points can respectively be calculated and recognized.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical touch apparatus, comprising:
two touch panels each having two lateral sides separated from each other in a predetermined direction and a touch zone located between the two lateral sides of each touch panel;
two optical sensing modules respectively disposed at or near one lateral side of each touch panel; and
a rail device coupled to the two touch panels, such that the two touch panels can slide along the predetermined direction and can be selectively operated at one of a first touching mode and a second touching mode;
wherein in the first touching mode, the two touch panels are moved toward each other until one of the touch panels overlaps another one of the touch panels, the touch zone of one of the touch panels arranged atop is exposed and operable and the touch zone of the another one of the touch panels arranged underneath is shielded and inoperable, and the optical sensing module of the another one of the touch panels arranged underneath is exposed outside the lateral side of the touch panel arranged atop and is positioned above a plane where the touch zone of the touch panel arranged atop exists, such that the touch zone of the touch panels arranged atop is detected by the two optical sensing modules together at the two lateral sides thereof;
wherein in the second touching mode, the two touch panels are moved away from each other along the predetermined direction, until the two touch zones both are exposed and operable, such that each touch zone of the two touch panels is detected independently by one of the two optical sensing modules disposed thereon.

2. The optical touch apparatus according to claim 1, wherein the two touch panels comprise a first touch panel and a second touch panel, each of the first touch panel and the second touch panel has a left lateral side and a right lateral side separated from each other, the two optical sensing modules comprise a first optical sensing module and a second optical sensing module, each of the first optical sensing module and the second optical sensing module is composed of at least two optical sensors, the first optical sensing module is disposed at one of the right lateral side of the first touch panel and the left lateral side of the first touch panel, and the second optical sensing module is disposed at one of the left lateral side of the second touch panel and the right lateral side of the second touch panel.

3. The optical touch apparatus according to claim 2, wherein each of the first touch panel and the second touch panel has an upper side and a lower side separated from each other, the rail device comprises a first rail and a second rail, the first rail and the second rail are installed on at least one of the upper side and the lower side of the first touch panel and the second touch panel, such that the first rail and the second rail can be connected to each other and slide with respect to each other along the predetermined direction which is a horizontal direction.

4. The optical touch apparatus according to claim 3, wherein the first optical sensing module comprises two first optical sensors respectively disposed at a top right corner of the first touch panel defined by the right lateral side and the upper side and a bottom right corner of the first touch panel defined by the right lateral side and the lower side; the second optical sensing module comprises two second optical sensors respectively disposed at a top left corner of the second touch panel connected to the left lateral side and the upper side and a bottom left corner of the second touch panel connected to the left lateral side and the lower side.

5. The optical touch apparatus according to claim 3, wherein each of the first rail and the second rail is a protruded structure, and the first optical sensing module and the second optical sensing module are disposed on the protruded structures respectively.

6. The optical touch apparatus according to claim 2, wherein the first optical sensing module is separated from the first touch panel by a first interval distance in a vertical height direction; the second optical sensing module is separated from the second touch panel by a second interval distance in the vertical height direction, and the second interval distance is larger than the first interval distance.

7. The optical touch apparatus according to claim 1, wherein each of the optical sensing modules at least comprises a light source and an optical image capturing sensor, the optical touch apparatus further comprises at least a reflective element operated on each of the touch panels for reflecting a light received from the light source, and a reflected light is detected by the optical image capturing sensor for calculating a touch position of the reflective element.

8. The optical touch apparatus according to claim 1, wherein the rail device further comprises a sliding aid which assists the two touch panels to smoothly slide with respect each other.

9. The optical touch apparatus according to claim 1, further comprises a sensing switch disposed between the two touch panels for detecting whether the two touch panels are operated in the first touching mode or the second touching mode.

10. The optical touch apparatus according to claim 9, further comprises a controller coupled to the two optical sensing modules and the sensing switch, the controller is operated in a first positioning mode when the sensing switch detects that the two touch panels are operated in the first touching mode, and the controller is operated in a second positioning mode when the sensing switch detects that the two touch panels are in the second touching mode.

11. The optical touch apparatus according to claim 1, further comprises a bracket on which the two touch panels and the rail device are installed.

* * * * *